United States Patent [19]

Tsuya et al.

[11] 3,956,146

[45] May 11, 1976

[54] SELF-LUBRICATING WEAR-RESISTANT COMPOSITE MATERIALS

[75] Inventors: Yuko Tsuya; Kazunori Umeda; Hirofumi Shimura, all of Tokyo, Japan

[73] Assignee: Agency of Industrial Science & Technology, Tokyo, Japan

[22] Filed: July 18, 1974

[21] Appl. No.: 489,758

[30] Foreign Application Priority Data

July 20, 1973 Japan.............................. 48-81904

[52] U.S. Cl. ................................................ 252/12
[51] Int. Cl.$^2$...................... C10M 5/00; C10M 7/00
[58] Field of Search.................... 252/12, 12.2, 12.4, 252/12.6

[56] References Cited
UNITED STATES PATENTS

| | | | |
|---|---|---|---|
| 2,214,104 | 9/1940 | Hildabolt et al. ...................... | 252/12 |
| 2,788,324 | 4/1957 | Mitchell................................ | 252/12 |
| 2,977,302 | 3/1961 | Spengler et al. ...................... | 252/12 |
| 3,607,248 | 9/1971 | Wallace ................................ | 252/12 |
| 3,678,145 | 7/1972 | Boes .................................... | 252/12 |
| 3,793,195 | 2/1974 | Betts..................................... | 252/12 |

*Primary Examiner*—Delbert E. Gantz
*Assistant Examiner*—I. Vaughn
*Attorney, Agent, or Firm*—Kurt Kelman

[57] ABSTRACT

Self-lubricating wear-resistant composite materials are produced by blending a metal powder matrix with a combination of molybdenum disulfide and tungsten disulfide powders, compression-molding the blend and then sintering the molding at 800° to 1000°C. When the combination of molybdenum disulfide and tungsten disulfide is blended with a metal powder matrix as described above, the molybdenum disulfide reacts with the metal powder matrix and consequently reinforces the metal matrix and the tungsten disulfide is dispersed as a lubricant element in the resultant composite material, giving rise to a composite material excellent in mechanical strength and lubricating property.

4 Claims, 10 Drawing Figures

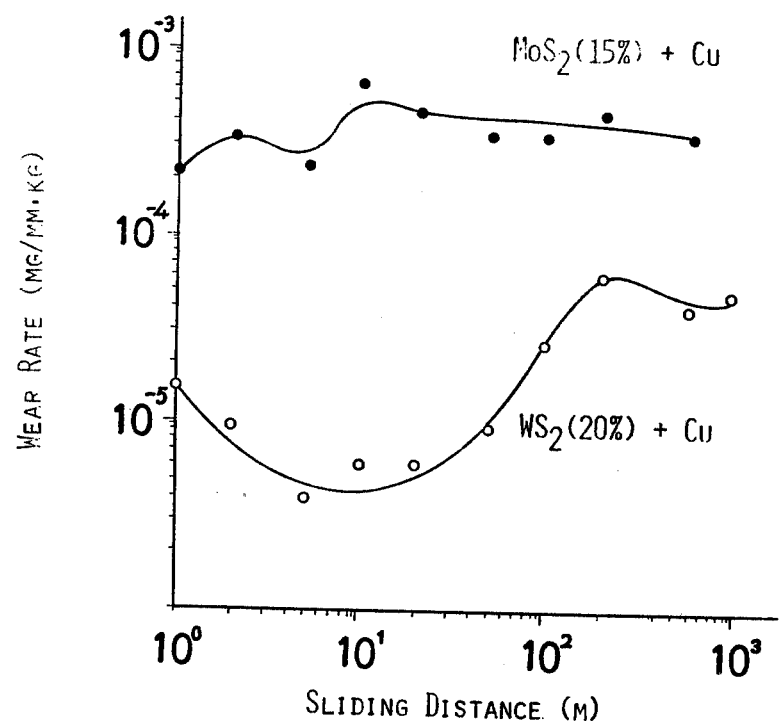
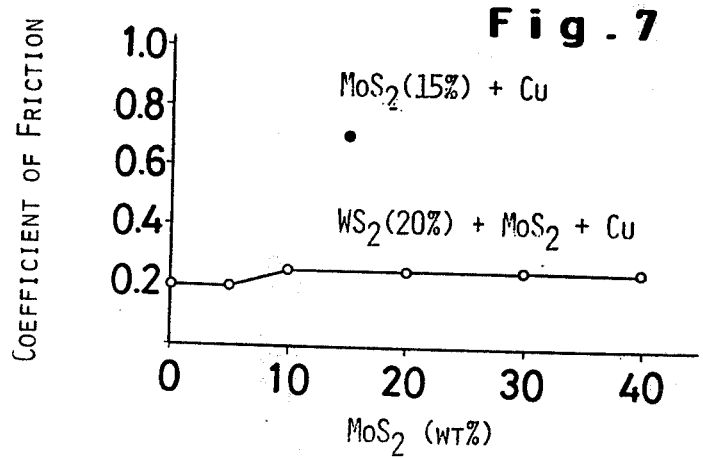

SELF-LUBRICATING WEAR-RESISTANT COMPOSITE MATERIALS

BACKGROUND OF THE INVENTION

This invention relates to self-lubricating wear-resistant composite materials.

There are known two types of self-lubricating composite materials. Composite materials obtained by blending a solid lubricant with a metal powder matrix, molding the blend and sintering the molding belong to one of the types, and composite materials produced by impregnating a sintered porous metal matrix with a solid lubricant belong to the other type. Generally, those of the latter type are superior to those of the former type in terms of wear rate and mechanical properties. Composite materials of the latter type are, however, difficult to manufacture, if the impregnation of a solid lubricant such as, for example, molybdenum disulfide or graphite, which do not melt during the preparation process, is wanted in the composite. Composite materials of the former type are, in contrast, easy to produce because the solid lubricant and the metal both are blended in a powdery form.

In the aforementioned process of manufacturing self-lubricating composite materials, there arise cases in which certain metals behave so as to react chemically with particular kinds of solid lubricants. In such a case, the composite material to be obtained consequently has enhanced mechanical strength and reduced electrical conductivity but exhibits poor lubricating property unless the particular kind of solid lubricant is used in large amounts greater than is stoichiometrically consumed in the reaction with the metal. When the composite material is produced by using a solid lubricant which in the process of production is inactive with the metal matrix, it exhibits an excellent lubricating property but has ion mechanical strength because the binding force of metal matrix is not sufficient.

It is an object of this invention to provide self-lubricating wear-resistant composite materials which excel in lubricating property, wear rate as well as in mechanical strength.

SUMMARY OF THE INVENTION

To attain the object described above according to the present invention, there are provided self-lubricating wear-resistant composite materials which are obtained by blending a metal powder matrix containing copper or nickel with a combination of tungsten disulfide and molybdenum disulfide each in the form of a powder, compression-molding the blend and thereafter sintering the molding in a vacuum at 800° – 1000°C.

When self-lubricating wear-resistant composite materials are produced according to this method, the metal matrix is improved in mechanical strength because of the reaction of the metal matrix with the molybdenum disulfide and the composite material has its wear rate lowered because of the presence of tungsten disulfide as an internal lubricant and the modified strength of the matrix. Thus, there are obtained wear-resistant composite materials which provide a stable performance over a long period of service.

Other object and other features of the present invention will become apparent from the detailed description to be given herein below with reference to the accompanying drawing.

BRIEF EXPLANATION OF THE DRAWING

FIG. 3 is a graph showing the relation between the sliding distance and the wear rate of a composite material of copper and molybdenum disulfide and a composite material of copper and tungsten disulfide.

FIG. 7 is a graph showing the relation between the coefficient of friction and the amount of molybdenum disulfide added in the copper-based composite materials with 20% of tungsten disulfide and molybdenum disulfide.

DETAILED EXPLANATION OF THE INVENTION

Figure 1:
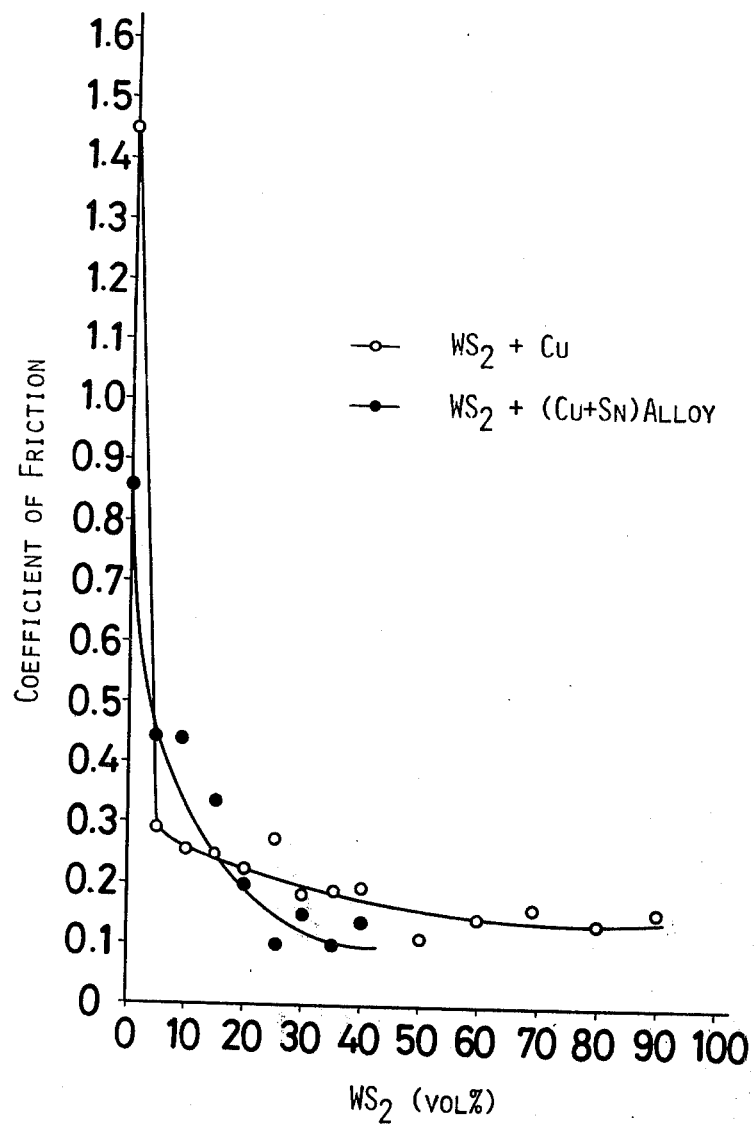
FIG. 1 is a graph showing the relation between the coefficient of friction and the amount of tungsten added in composite materials of copper and tungsten disulfide.

FIG. 1 is a graph which shows the relation between the amount of tungsten disulfide added and the coefficient of friction in wear-resistant composite materials having tungsten disulfide blended with metal matrices. From the graph of FIG. 1, it is clear that in the case of the composite materials using a metal matrix solely of copper, the coefficient of friction of the material is maintained below 0.3 so long as the amount of tungsten disulfide added is not less than 5% by weight and that in the case of the matrix of copper-tin alloy based composite materials consisting of copper and tin in a ratio of 9:1, the coefficient of friction falls below 0.2 so long as the amount of tungsten disulfide added exceeds 20% by weight.

Figure 2:
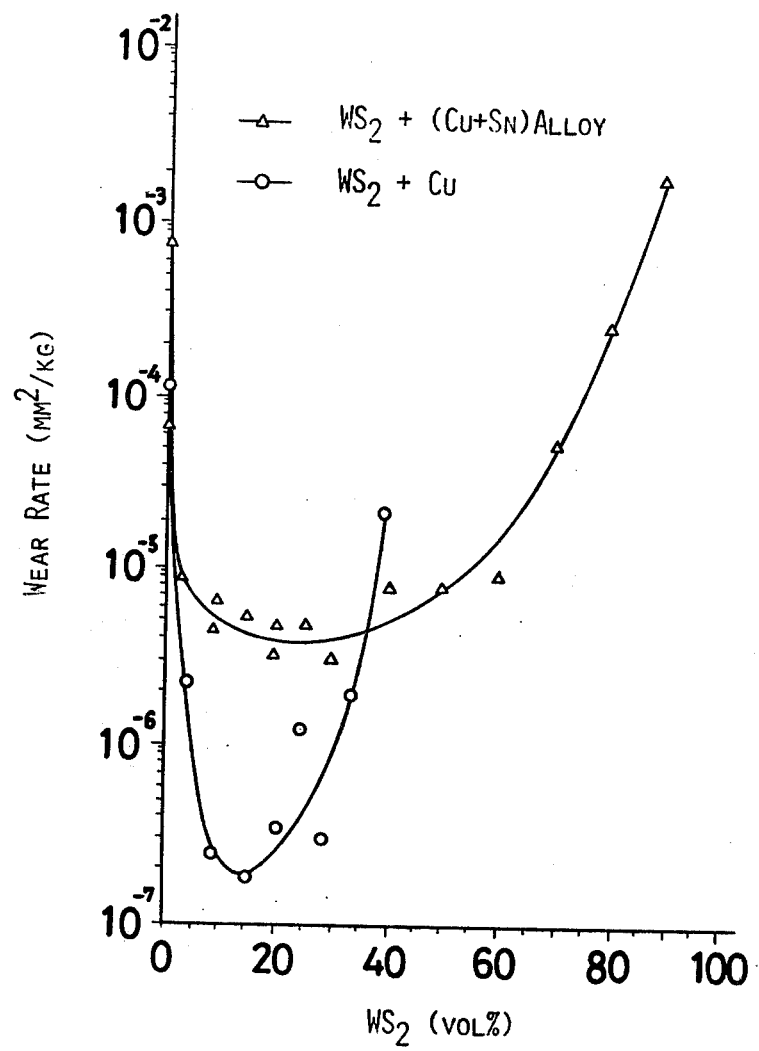
FIG. 2 is a graph showing the relation between the wear rate and the amount of tungsten disulfide added in the composite materials of FIG. 1.

The wear rates of the wear-resistant composite materials described above are shown in FIG. 2. This graph indicates that in both the composite materials, one using copper along and the other a copper-tin alloy as metal matrices respectively, the wear rates are lowest when the amounts of tungsten disulfide added are in the range of from 10 to 25%.

As concerns the wear rate as a function of the distance of travel, the graph of FIG. 3 shows that in the case of wear-resistant composite materials using a metal matrix of copper and involving addition of 20% by weight of tungsten disulfide, the wear rate which is substantially constant for a fixed distance of travel increases with the increasing distance of travel because of factors such as fatigue of metal matrix, for example.

It is also seen from FIG. 3 that the copper-based composite materials having the molybdenum disulfide show notably high values of wear rate. A logical explanation for these high wear rates may reside in a postulate that the molybdenum disulfide added decomposes upon reaction with the copper of the metal matrix and this decomposition notably heightens the mechanical strength of the material while it simultaneously decreases the lubricating and the wear resisting properties.

The inventors prepared wear-resistant composite materials by using two metal matrices, one solely of copper and the other of a copper-tin alloy, and blending each with tungsten disulfide and molybdenum disulfide added thereto independently of each other and tested them for wear rate, coefficient of friction, hardness and compressive strength. The results of the tests are shown in Table 1:

TABLE 1

| Matrix metal | Cu | | Cu+Sn | (9:1) |
|---|---|---|---|---|
| Solid lubricant | $WS_2$ | $MoS_2$ | $WS_2$ | $MoS_2$ |
| Amount added(% by wt.) | (20%) | (15%) | (20%) | (15%) |
| (% by vol.) | 22 | 24 | 22 | 24 |
| Wear rate (mg/mm.kg) | $6 \times 10^{-6}$ | $3 \times 10^{-4}$ | $8 \times 10^{-7}$ | $4 \times 10^{-4}$ |
| Coefficient of Friction | 0.20 | 0.7 | 0.3 | 0.5 |
| Hardness(VHN) | 27 | 64 | 21 | 63 |
| Compressive strength (kg/mm²) | 150 | 248 | — | — |

As is clear from the foregoing table, in the case of composite materials involving the independent addition of tungsten disulfide, the tungsten disulfide functions effectively as a lubricant but the composite materials show inferior mechanical strengths such as, for example, relatively low values of compressive strength and of hardness. By contrast, composite materials involving the molybdenum disulfide are notably improved in mechanical properties such as compressive strength and hardness, although the molybdenum disulfide in the metals undergoes decomposition and therefore does not function effectively as a lubricant.

In view of this situation, the inventors pursued various studies in a search for a method capable of obtaining wear-resistant composite materials which retain the outstanding lubricating property of tungsten disulfide and at the same time have sufficient mechanical strengths. They consequently made the discovery that wear-resistant composite materials possessed of excellent properties as described herein below are obtained by blending a metal matrix with a combination of tungsten disulfide and molybdenum disulfide and sintering the resultant blend. This invention has been established based on this discovery.

As the metal matrix for this invention it is desirable to use a substance which reacts with molybdenum disulfide to impart an improved mechanical strength to the produced composite material but remains inactive with tungsten disulfide. As possible substances satisfying this requirement, copper and nickel have been tried. It has been found that where there is used a matrix metal capable of chemical reaction with tungsten disulfide, the aforementioned drawback can be overcome by increasing the amount of tungsten disulfide to be added. It has consequently been confirmed that other than copper and nickel, matrix metals of iron, silver, lead, tin, aluminum, zinc, gold, platinum, tantalum, tungsten, molybdenum, nickel-copper alloy, silver-copper alloy, tungsten-copper alloy, molybdenum-copper alloy, copper-beryllium-cobalt alloy, etc. can be used.

It is necessary that the amounts of tungsten disulfide and molybdenum disulfide to be added to and blended with the metal matrix be properly fixed in accordance with the particular kind of matrix metal and the particular purpose of the use to which the produced wear-resistant composite material is put.

Figure 4:
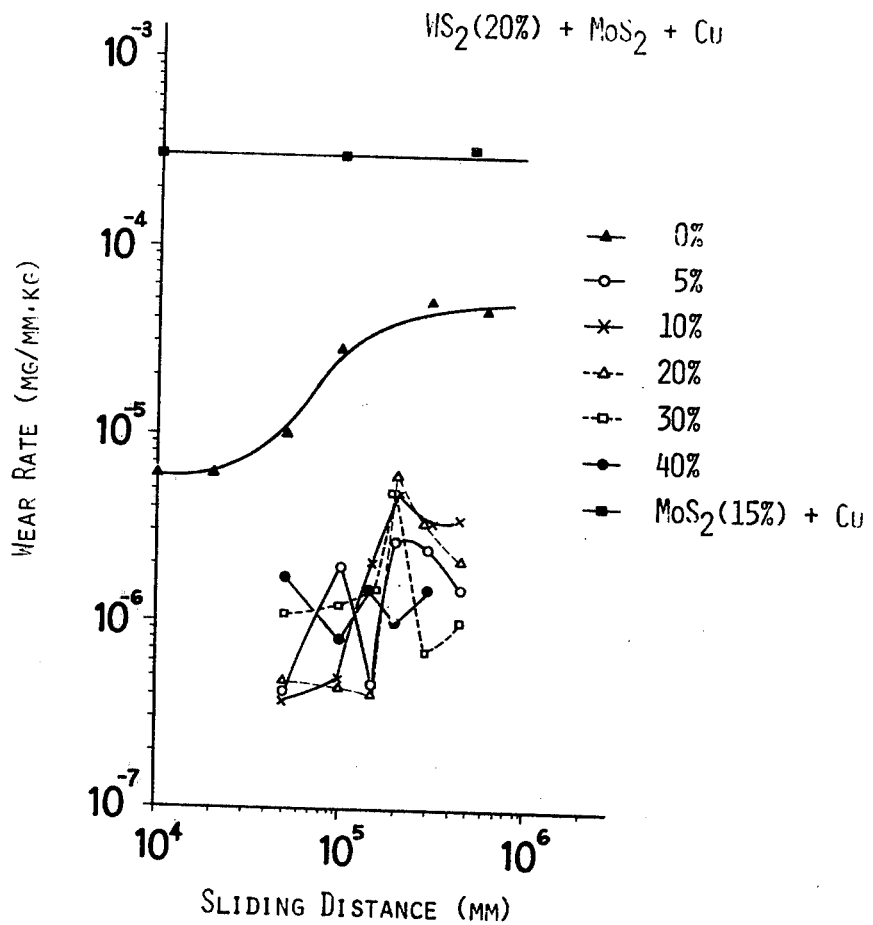
FIG. 4 is a graph showing the relation between the sliding distance and the wear rate of copper-based composite materials with 20% of tungsten disulfide and varying amounts of molybdenum disulfide.

FIG. 4 shows, by way of example, the wear rate as a function of the sliding distance involved in the case of wear-resistant composite materials produced by using copper as the matrix metal and adding thereto 20% of tungsten disulfide and varying amounts of molybdenum disulfide and, in comparison therewith, the wear rate similarly determined in the case of wear-resistant composite materials produced by adding molybdenum disulfide alone to the metal matrix. It is clear from the graph that in the composite material not having addition of molybdenum disulfide, the wear rate increases with the increasing sliding distance. In the case of the wear-resistant composite material having the addition of 15% of molybdenum disulfide to the metal matrix of copper, the wear rate is constant but is extremely high. In the case of the wear-resistant composite materials having the addition of molybdenum disulfide in amounts in the range of 5% to 40%, however, the wear rates are low and remain substantially unaffected by the increase in the sliding distance.

Figure 5:
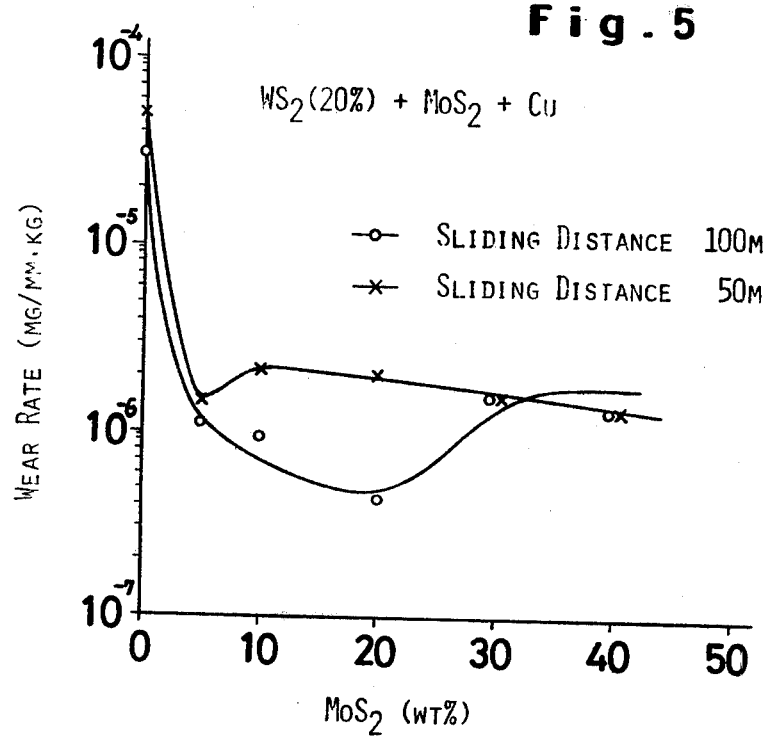
FIG. 5 is a graph showing the relation between the wear rate of copper-based composite materials and the amount of molybdenum disulfide added in copper-based composite materials with the combination of tungsten disulfide and molybdenum disulfide.

FIG. 5 shows the wear rate as a function of the amount of molybdenum disulfide added, determined by the sliding test, with a flat copper mating surface (1 cm²) at a rotation speed of 100 r.p.m. The graph indicates that the composite materials having an addition of a combination of tungsten disulfide and molybdenum disulfide show remarkably lower wear rates than the composite materials having addition of tungsten disulfide only.

Figure 6:
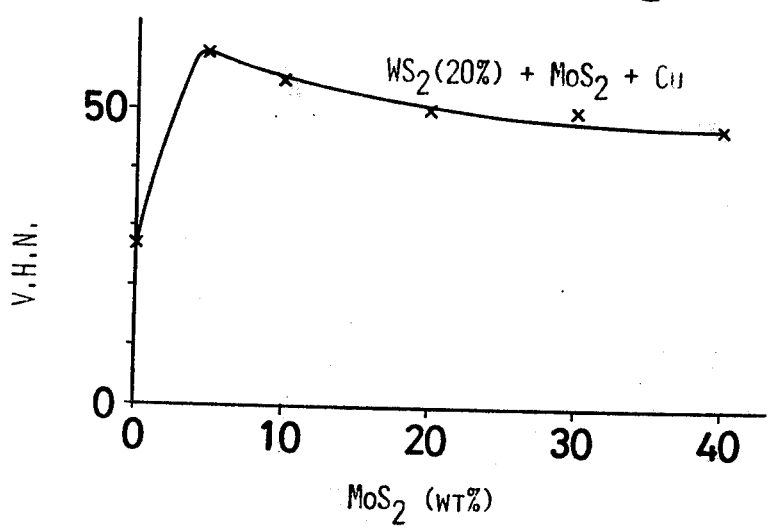
FIG. 6 is a graph showing the relation between the hardness (V.H.N.) and the amount of molybdenum disulfide added in the copper-based composite materials with 20% of tungsten disulfide and molybdenum disulfide.

The hardness of copper-based composite materials with 20% of tungsten disulfide and various amounts of molybdenum disulfide as a function of the amount of molybdenum disulfide added thereto is shown in the graph of FIG. 6. This graph indicates that compared with the hardness of a composite material having no addition of molybdenum disulfide the hardness of a composite material having addition of only 5% of molybdenum disulfide is conspicuously improved. As is evident from disulfide results in a notable increase in the mechanical strength of the produced composite material.

While the hardness of the composite material is increased by the addition of molybdenum disulfide as explained above, the coefficient of friction as indicated in FIG. 7 remains substantially the same when the amount of molybdenum disulfide added is increased as when there is no addition of molybdenum disulfide. To be more specific, the coefficient of friction which is about 0.7 in the total absence of tungsten disulfide is notably lowered to a substantially constant level by the addition of tungsten disulfide, irrespective of the amount of molybdenum disulfide added thereto. This is a sure indication that tungsten disulfide effectively functions as a lubricant element in the composite material.

Figure 8:
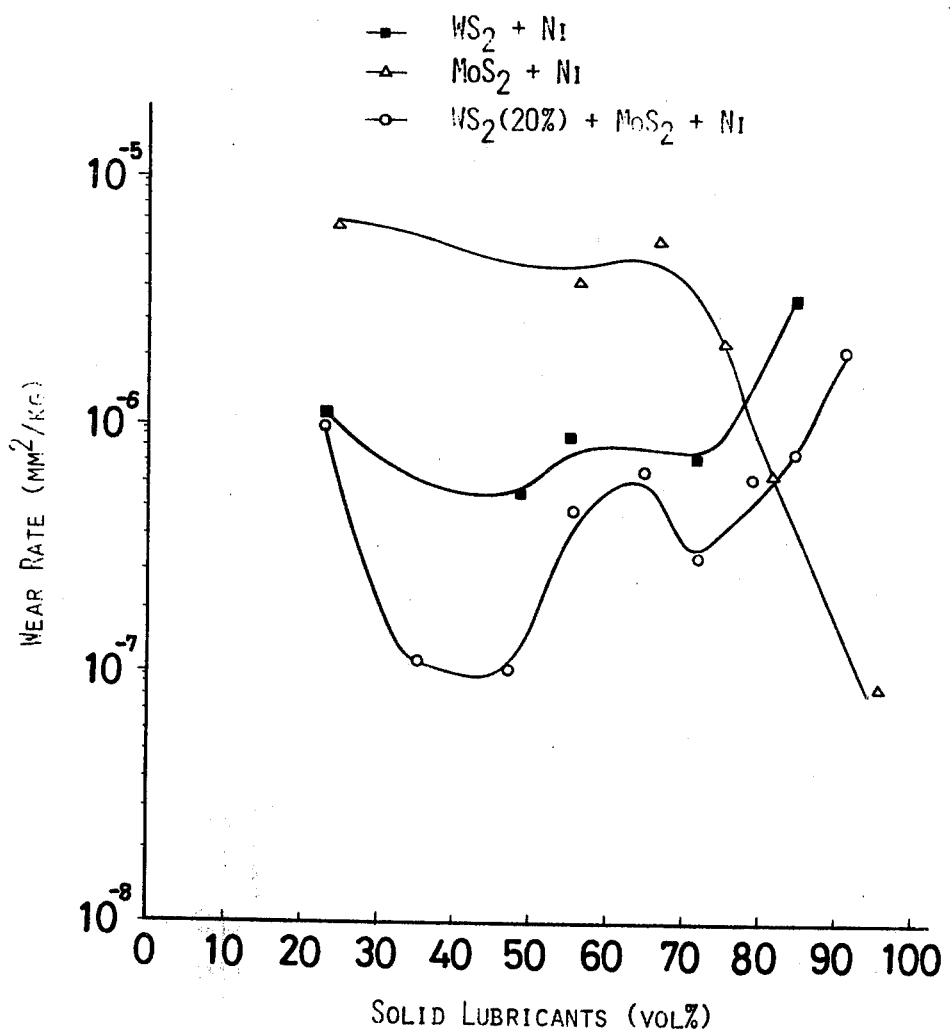
FIG. 8 is a graph showing the relation between the wear rate and the amount of solid lubricant added in nickel-based composite materials.

FIG. 8 shows the relation between the amount of solid lubricant added and the wear rate in nickel-based composite materials determined by the sliding test with a flat copper mating surface, under a pressure of 50 kg/cm$^2$ at a rotation speed of 500 r.p.m. The graph indicates that where tungsten disulfide alone is used as the solid lubricant, the wear rate increases from the low value in proportion to the increase of the amount of tungsten disulfide in the composite. This is because excess of tungsten disulfide reduces the strength of composite. Where molybdenum disulfide alone is used as the solid lubricant, the wear rate decreases from the high value with the increasing amount of molybdenum disulfide. As shown in FIG. 8, when the amount of molybdenum disulfide is more than 70%, the wear rate decreases remarkably. This is because nickel reacts with molybdenum disulfide and consequently the mechanical strength of the produced composite material is increased. When tungsten disulfide and molybdenum disulfide are used simultaneously as a combined solid lubricant, the wear rate is notably decreased when the total amount of solid lubricant added is in the range of from 30% to 50% by volume.

Figure 9:
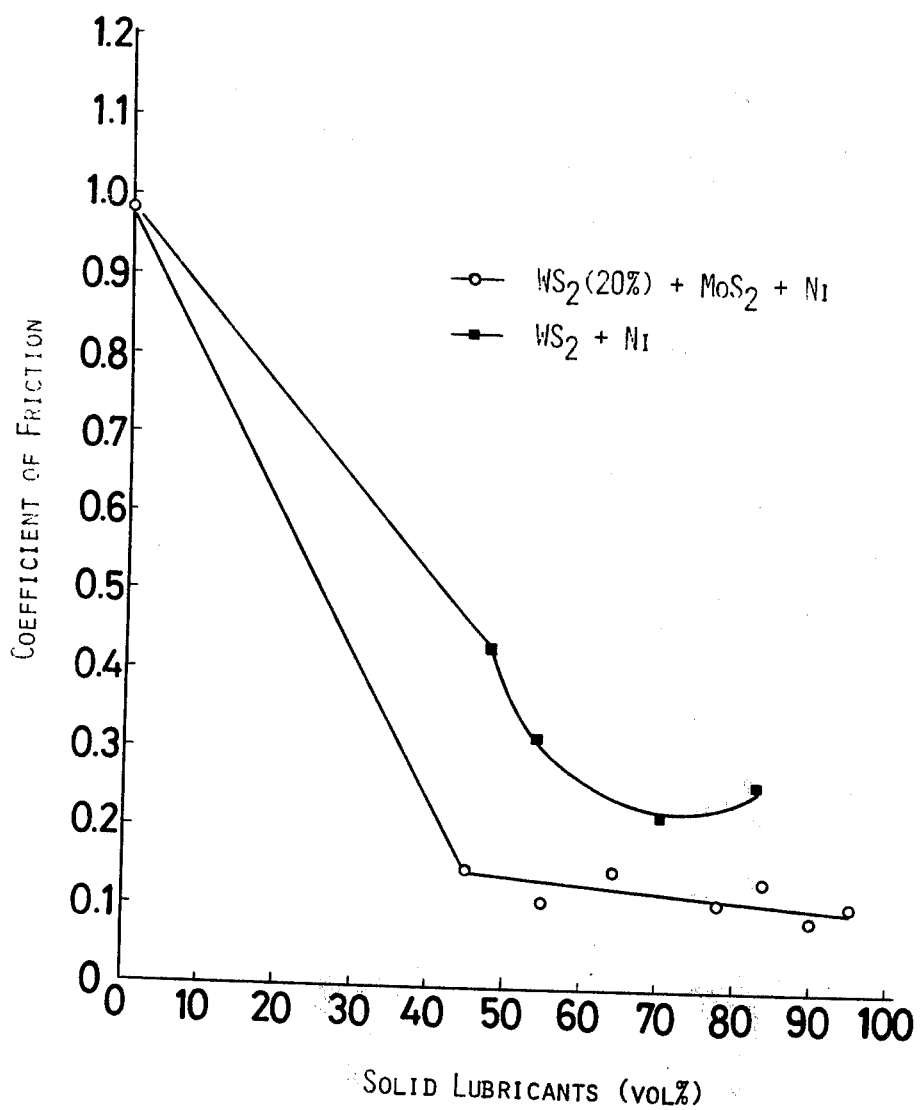
FIG. 9 is a graph showing the relation between the coefficient of friction and the amount of solid lubricant added in the composite materials of FIG. 8.

FIG. 9 shows the coefficient of friction as a function of the amount of solid lubricant added in the nickel-based composite. The graph indicates that the wear rate in the composite materials involving addition of tungsten disulfide and molybdenum disulfide as a combined solid lubricant is far lower than that in the composite materials having addition of tungsten disulfide as the sole lubricant.

Figure 10:
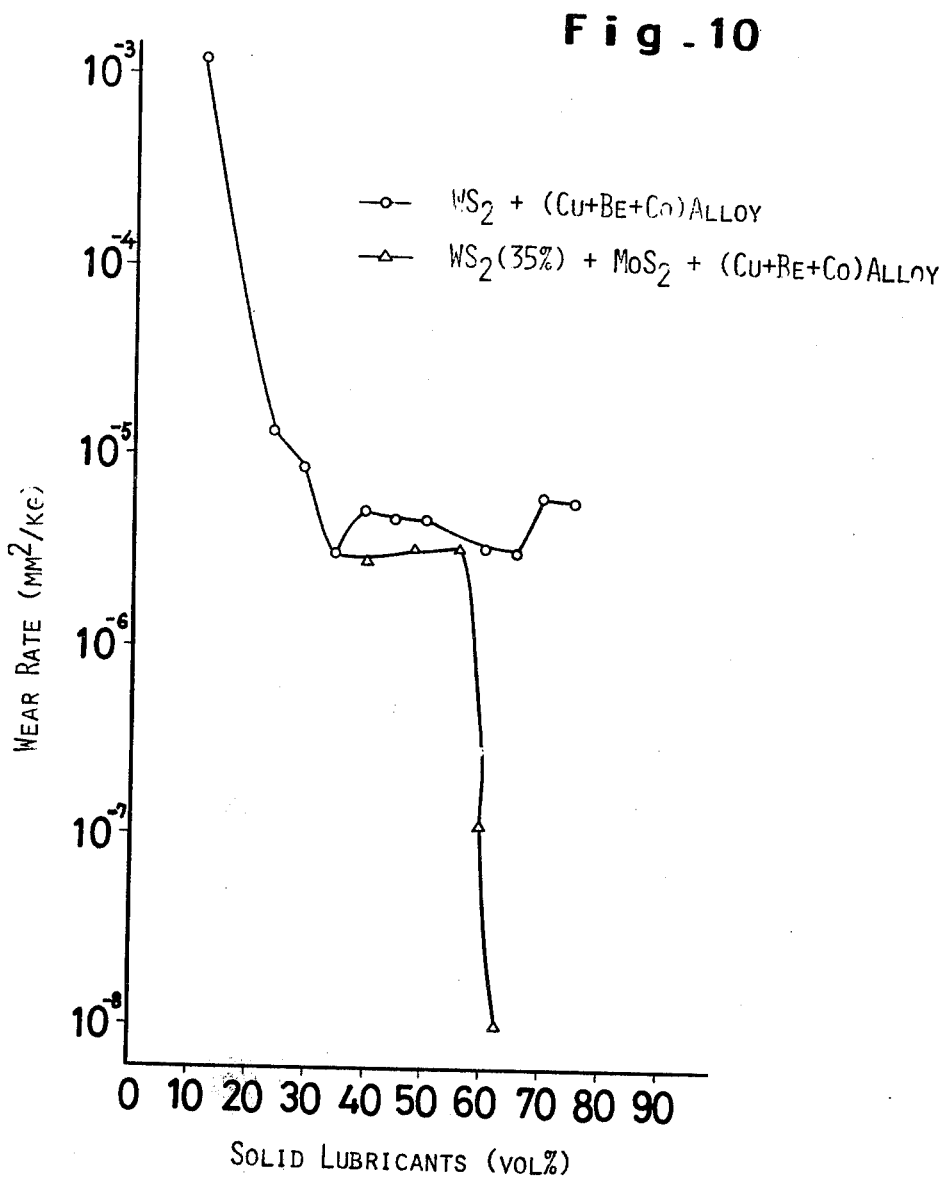
FIG. 10 is a graph showing the relation between the wear rate and the amount of solid lubricant added in the copper-beryllium-cobalt alloy based composite materials.

FIG. 10 shows the wear rate as a function of the amount of solid lubricant added in copper-beryllium-cobalt (95.5 : 2 : 2.5) alloy based composite materials. The test for wear rate in this case was performed, similarly to the test the results of which are indicated in FIG. 8, with a flat copper mating surface, under a pressure of 50 kg at a speed of 500 rpm. So far as the amount of solid lubricant added falls in the range of from 35% to 55%, the wear rate is substantially the same as when 90% of molybdenum disulfide alone is added and when the amounts of tungsten disulfide and molybdenum disulfide are added as a combined solid lubricant. As the amount of solid lubricant added exceeds 55%, however, the wear rate in composite materials having addition of a combined solid lubricant of tungsten disulfide and molybdenum disulfide decreases to a notable extent. But, this range of optimum amount of the combined solid lubricant depends on the sintering temperature. When wear rate, coefficient of friction, hardness, etc. based on the various data given above are considered, it is seen that the suitable amount of solid lubricant to be added falls in the range of from 20% to 70%. The combination ratio of tungsten disulfide and molybdenum disulfide must be suitably determined depending on the particular kind of matrix metal being used and sintering temperature, because the extent to which molybdenum disulfide reacts is varied by these factors. Where nickel, a metal readily reactive with molybdenum disulfide, is used as the matrix metal, for example, the amount of molybdenum disulfide to be added may be selected in the range of from 40% to 90% so that the reaction of nickel with tungsten disulfide will be repressed, the strength of matrix metal enhanced and at the same time the lubricating property of tungsten disulfide sufficiently manifested. Where silver, a metal which does not readily react with molybdenum disulfide, is used as the matrix metal, the amount of molybdenum disulfide to be added may be relatively small, in the range of from 20% to 50%. Thus, the combination ratio of tungsten disulfide and molybdenum disulfide generally falls in a wide range of from 10 : 90 to 80 : 20. The amount of solid lubricant to be added and the mixing ratio of its components are to be suitably selected, depending on the particular kind of matrix metal and the purpose of the composite material application.

Composite materials of the present invention can be obtained by any of the known methods of manufacture. For example, a composite material is obtained by comminuting the matrix metal and the combined solid lubricant, blending the powders, subsequently compression-molding the blend and sintering the resultant molding in a vacuum at 700°C to 1000°C for 1 to 3 hours. The sintered composite material thus obtained may further be compression-molded and sintered as occasion demands. The hot-press process by which both compression-molding and sintering are carried out at the same time on the blend may be employed where desired.

As is clear from the foregoing detailed description of the invention, the self-lubricating wear-resistant composite material according to this invention requires addition of a combination of molybdenum disulfide and tungsten disulfide to the matrix metal and, because of this requirement, the mechanical strength of the produced composite material can be improved by the reaction of molybdenum disulfide with the matrix metal and at the same time the coefficient of friction can be maintained at a low value by the presence of residual tungsten disulfide. Moreover, an excellent wear rate of the composite and mating surface can be obtained by the existence of residual tungsten disulfide and the good mechanical properties provided by the existence of residual metal and the reaction product between molybdenum disulfide and metal. Further, composite materials suitable for intended uses can easily be obtained by properly selecting the kind of matrix metal, the total amount of solid lubricant added, the combination ratio of tungsten disulfide and molybdenum disulfide, etc. Any of the conventional methods can be used in their unmodified form for the manufacture of these sintered composite materials. No impregnation of solid lubricant is required. Thus, the manufacture is easy and wear-resistant composite materials of uniform quality can be obtained.

What is claimed is:

1. A self-lubricating wear-resistant composite material consisting essentially of tungsten disulfide dispersed in a matrix formed by the sintering reaction at 800° to 1000°C. of a molded compression blend of molybdenum disulfide with a matrix metal selected from the group consisting of copper, copper alloy and nickel, said tungsten disulfide being dispersed in the resultant composite material as a lubricant.

2. The self-lubricating wear-resistant composite material of claim 1, wherein the amount of tungsten disulfide is in the range of from 2% to 90% by vol.

3. The self-lubricating wear-resistant composite material of claim 1, wherein the amount of molybdenum disulfide is in the range of from 2% to 90% by vol.

4. The self-lubricating wear-resistant composite material of claim 1, wherein total amount of solid lubricant of molybdenum disulfide and tungsten disulfide in the composite material is 20% to 95% by vol.

* * * * *